US012703833B2

(12) United States Patent
Weber et al.

(10) Patent No.: US 12,703,833 B2
(45) Date of Patent: Aug. 11, 2026

(54) ALKYLATED NAPTHALENE BLENDSTOCKS AND PROCESSES FOR PRODUCING THE SAME

(71) Applicant: ExxonMobil Technology and Engineering Company, Baytown, TX (US)

(72) Inventors: Jorg F. W. Weber, Houston, TX (US); Michael L. Blumenfeld, Annandale, NJ (US); Harrison T. Hawkins, Medford, NJ (US); William W. Lonergan, Humble, TX (US); Zachary D. Young, Lansdale, PA (US); Sina Sartipi, Willebroek (BE); Mabel G. Lam, Seabrook, TX (US); Samuel J. Caterina, League City, TX (US)

(73) Assignee: ExxonMobil Technology and Engineering Company, Baytown, TX (US)

( * ) Notice: Subject to any disclaimer, the term of this patent is extended or adjusted under 35 U.S.C. 154(b) by 0 days.

(21) Appl. No.: 18/820,022

(22) Filed: Aug. 29, 2024

(65) Prior Publication Data

US 2025/0075142 A1 Mar. 6, 2025

Related U.S. Application Data

(60) Provisional application No. 63/580,733, filed on Sep. 6, 2023.

(51) Int. Cl.

| | |
|---|---|
| ***C10M 105/06*** | (2006.01) |
| ***B01J 29/70*** | (2006.01) |
| *C10M 177/00* | (2006.01) |
| *C10N 20/00* | (2006.01) |
| *C10N 20/02* | (2006.01) |
| *C10N 20/06* | (2006.01) |
| *C10N 70/00* | (2006.01) |

(52) U.S. Cl.

CPC ........ *C10M 105/06* (2013.01); *B01J 29/7038* (2013.01); *C10M 177/00* (2013.01); *C10M 2203/1065* (2013.01); *C10N 2020/02* (2013.01); *C10N 2020/06* (2013.01); *C10N 2020/067* (2020.05); *C10N 2070/00* (2013.01)

(58) Field of Classification Search

CPC .............. C10M 105/06; C10M 177/00; C10M 2203/1065; C10M 2203/065; C10M 2205/028; C10M 111/00; B01J 29/7038; C10N 2020/02; C10N 2020/06; C10N 2020/067; C10N 2070/00; C10N 2030/02; C10N 2030/74; C07C 2/66; C07C 2529/70

See application file for complete search history.

(56) References Cited

U.S. PATENT DOCUMENTS

| | | | |
|---|---|---|---|
| 3,140,251 A | 7/1964 | Plank et al. | |
| 4,439,409 A | 3/1984 | Puppe et al. | |
| 4,826,667 A | 5/1989 | Zones et al. | |
| 4,954,325 A | 9/1990 | Rubin et al. | |
| 5,191,134 A | 3/1993 | Le | |
| 5,236,575 A | 8/1993 | Bennett et al. | |
| 5,250,277 A | 10/1993 | Kresge et al. | |
| 5,362,697 A | 11/1994 | Fung et al. | |
| 5,602,086 A | 2/1997 | Le et al. | |
| 6,077,498 A | 6/2000 | Diaz Cabanas et al. | |
| 6,231,751 B1 | 5/2001 | Canos et al. | |
| 6,756,030 B1 | 6/2004 | Rohde et al. | |
| 7,713,513 B2 | 5/2010 | Jan et al. | |
| 7,842,277 B2 | 11/2010 | Roth et al. | |
| 7,982,084 B1 | 7/2011 | Moscoso et al. | |
| 8,704,023 B2 | 4/2014 | Roth et al. | |
| 8,704,025 B2 | 4/2014 | Roth et al. | |
| 2011/0082061 A1 | 4/2011 | Carey et al. | |
| 2017/0368540 A1 | 12/2017 | Mettler et al. | |
| 2020/0377431 A1* | 12/2020 | Ide | B01J 35/40 |
| 2023/0052422 A1 | 2/2023 | Lewis et al. | |
| 2023/0278879 A1* | 9/2023 | Ha | C01B 39/04 502/64 |

FOREIGN PATENT DOCUMENTS

| | | |
|---|---|---|
| EP | 0293032 A2 | 11/1988 |
| WO | 97/17290 A1 | 5/1997 |

(Continued)

OTHER PUBLICATIONS

Luo, H. Y. et al., (2015) "One-pot synthesis of MWW zeolite nanosheets using a rationally designed organic structure-detecting agent", Chemical science, vol. 06, No. 11, pp. 6320-6324. (PM).

(Continued)

*Primary Examiner* — Cephia D Toomer
(74) *Attorney, Agent, or Firm* — Vorys, Sater, Seymour and Pease LLP

(57) ABSTRACT

Alkylated naphthalene blendstock and processes for making the alkylated naphthalene blendstock are provided. The present processes comprise mixing an acid-form MWW-type catalyst, naphthalene, and a solvent to provide a reaction mixture and adding linear alpha olefins to the reaction mixture after heating. The resulting AN blendstock has an isomer ratio of less than 45 wt % mono alkylated naphthalene and greater than 55 wt % multi-alkylated naphthalene and can be combined with polyalphaolefin base stock to provide a synthetic lubricant formulation produced without triflic catalyst and with less process steps.

11 Claims, No Drawings

(56) References Cited

FOREIGN PATENT DOCUMENTS

| | | | | |
|---|---|---|---|---|
| WO | 2011/041647 | A1 | 4/2011 | |
| WO | WO-2015112293 | A1 * | 7/2015 | .............. B01J 35/77 |
| WO | 2025/054079 | A1 | 3/2025 | |

OTHER PUBLICATIONS

International Search Report and Written Opinion received for PCT Application No. PCT/US2024/044528, mailing date Nov. 22, 2024, 12 Pages.

Shi, Y. et al. (2016) “Shape selectivity of beta and MCM-49 zeolites in liquid-phase alkylation of benzene with ethylene”, Journal of Molecular Catalysis A: Chemical, vol. 418, pp. 86-94. (ISR-WO).

* cited by examiner

ALKYLATED NAPTHALENE BLENDSTOCKS AND PROCESSES FOR PRODUCING THE SAME

CROSS-REFERENCE TO RELATED APPLICATION

This application claims the priority benefit of U.S. Ser. No. 63/580,733, filed Sep. 6, 2023, which is incorporated herein by reference.

FIELD

The present disclosure relates to processes for producing alkylated naphthalene blendstocks useful in synthetic lubricant formulations.

BACKGROUND

Two alkylated naphthalene blendstocks, AN5 blendstock having a kinematic viscosity at 100° C. of 5 cSt (KV100~5 cSt) and AN12 blendstock having a kinematic viscosity at 100° C. of 12 cSt (KV100~12 cSt) are combined with a polyalphaolefin base stock to produce a synthetic lubricant formulation having high stability under extreme operating conditions. AN12 is produced with a homogeneous triflic acid catalyst that is very corrosive. Because of the necessary equipment metallurgy, significant capital investment is required to produce the AN12 blendstock, making the synthetic lubricant formulation more expensive to produce.

SUMMARY

Provided herein are processes for making an AN blendstock comprising mixing an acid-form MWW-type catalyst, naphthalene, and a solvent to provide a reaction mixture; increasing the temperature of the reaction mixture; and adding linear alpha olefins to the reaction mixture to produce the AN blendstock having an isomer ratio of less than 45 wt % mono alkylated naphthalene and greater than 55 wt % multi-alkylated naphthalene. The acid-form MWW-type catalyst has an average particle distribution between 55 μm and 85 μm, a surface area between 475 and 600 $m^2/g$, and a total acidity of between 0.80 and 1.0 meq/g TPAD.

Also provided is an AN blendstock comprising monoalkylated naphthalene and multi-alkylated naphthalene AN blendstock having between 7.0 and 9.5 cSt KV100 measured by ASTM D445 and between 5.0 and 11.0 Noack % measured by ASTM D5800. The AN blendstock has an isomer ratio of less than 45 wt % mono alkylated naphthalene and greater than 55 wt % multi-alkylated naphthalene.

Further provided is an acid-form MWW-type catalyst composition comprising between 5.0 wt % and 7.5 wt % alumina; between 69 wt % and 80 wt % silica; between about 17.0 wt % and 24.0 wt % $Si/Al_2$; less than 0.03 wt % potassium; and less than or equal to 0.05 wt % sodium as measured by ICP Test. The acid-form MWW type of catalyst has an average particle size distribution between 55 μm and 85 μm, a total surface area between 475 and 600 $m^2/g$, a total acidity between 0.80 and 1.0 meq/g TPAD and collidine uptake between 90 and 145 μmol/g and 125 and 145 μmol/g.

DETAILED DESCRIPTION

Before the present compounds, components, compositions, and/or methods are disclosed and described, it is to be understood that unless otherwise indicated this disclosure is not limited to specific compounds, components, compositions, reactants, reaction conditions, ligands, catalyst structures, or the like, as such may vary, unless otherwise specified. It is also to be understood that the terminology used herein is for the purpose of describing different embodiments and is not intended to be limiting.

All numerical values within this detailed description and claims should be considered modified by "about" or "approximately" the indicated value to account for experimental error and variations.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited.

Additionally, within a range includes every point or individual value between its end points even though not explicitly recited. Thus, every point or individual value may serve as its own lower or upper limit combined with any other point or individual value or any other lower or upper limit, to recite a range not explicitly recited.

For the purposes of this disclosure, the following definitions will apply:

As used herein, the terms "a" and "the" as used herein are understood to encompass the plural as well as the singular.

As used herein, the term "as-synthesized MWW-type zeolite" means and includes commercially available MWW-type zeolite.

As used herein, the term "acid-form MWW-type zeolite" means and includes the as-synthesized MWW-type zeolite modified via ion exchange and incinerated to alter and remove organic impurities. Incineration often includes calcination under $N_2$ followed by calcination under air.

As used herein, the term "as-synthesized MWW-type zeolite MCM-22" is interchangeable with the terms "MCM-22," "zeolite MCM-22" and "as-synthesized MCM-22."

As used herein, the term "as-synthesized MWW-type zeolite MCM-49" is interchangeable with the terms "MCM-49," "zeolite MCM-49" and "as-synthesized MCM-49."

Zeolites and Zeolitic Materials

Zeolites and their isotypes are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three-letter code and are described in the "Atlas of Zeolite Framework Types," eds. Ch. Baerlocher, L. B. McCusker, and D. H. Olson, Elsevier, Sixth Edition, 2007, which is hereby incorporated by reference.

Certain zeolites comprise an inorganic framework type where the silicon tetrahedral atoms are connected by oxygen atoms with the four next-nearest tetrahedral atoms. The term "silicate", as used herein, refers to a substance comprising silicon and oxygen atoms alternately bonded to each other (i.e., —O—Si—O—Si—), and optionally comprise other types of atoms within the inorganic framework type, including boron, gallium, aluminum, or other metals (e.g., transition metals, such as titanium, vanadium, or zinc). Atoms other than silicon and oxygen in the framework occupy a portion of the lattice sites that would be otherwise occupied by silicon atoms in an 'all-silica' framework (also referred to as "silicate"). Thus, the term "framework silicate" or "zeolite framework silicate" refers to an atomic lattice comprising silicate, borosilicate, gallosilicate, ferrisilicate, aluminosilicate, titanosilicate, zincosilicate, vanadosilicate, and the like. As noted above, the framework structure within a zeolite determines the size of the pores or channels. The pore or channel size determines the type of process for which a given zeolite is applicable. Currently, there are more than 200 known zeolite framework silicates recognized by the Structure Commission of the International Zeolite Association, providing a range of pore geometries and orientations defined.

The zeolite framework silicate is commonly characterized in terms of ring size, wherein the ring size refers to the number of silicon atoms (or alternative atoms, such as those listed above) that are tetrahedrally coordinated with oxygen atoms in a loop to define a pore or channel within the interior of the zeolite. For example, an "8-ring" zeolite refers to a zeolite having pores or channels defined by 8 alternating tetrahedral atoms and 8 oxygen atoms in a loop. The pores or channels defined within a given zeolite are symmetrical or asymmetrical depending upon various structural constraints that are present in the framework silicate.

Zeolites can be classified as having small, medium, large, and extra-large pore structures for pore windows delimited by 8, 10, 12, and more than 12 T-atoms, respectively. Extra-large pore zeolites (>12R) include, for example, AET (14R, e.g., ALPO-8), SFN (14R, e.g., SSZ-59), VFI (18R, e.g., VPI-5), CLO (20R, e.g., cloverite), and ITV (30R, e.g., ITQ-37) framework type zeolites. Extra-large pore zeolites generally have a free pore diameter of larger than about 0.8 nm. Large pore zeolites (12R) include, for example, LTL, MAZ, FAU, EMT, OFF, MTW, *BEA, MOR, and SFS framework type zeolites, e.g., mazzite, offretite, zeolite L, zeolite Y, zeolite X, omega, ZSM-2, ZSM-12, zeolite T, Beta, and SSZ-56. Large pore zeolites generally have a free pore diameter of 0.6 to 0.8 nm. Medium (or intermediate) pore size zeolites (10R) include, for example, MFI, MEL, *MRE, EUO, MTT, MFS, AEL, AFO, HEU, FER, MWW, and TON framework type zeolites, e.g., ZSM-5, ZSM-11, ZSM-48, ZSM-22, ZSM-23, ZSM-35, MCM-22, MCM-49, silicalite-1, and silicalite-2. Medium pore size zeolites generally have a free pore diameter of 0.45 nm to 0.6 nm. Small pore size zeolites (8R) include, for example, CHA, RTH, ERI, KFI, LEV, and LTA framework type zeolites, e.g., ZK-4, SAPO-34, SAPO-35, ZK-14, SAPO-42, ZK-21, ZK-22, ZK-5, ZK-20, zeolite A, chabazite, and ALPO-17. Small pore size zeolites generally have a free pore diameter of 0.3 nm to 0.45 nm.

Molecular sieve materials, both natural and synthetic, can be used as adsorbents and have catalytic properties for hydrocarbon conversion reactions. Certain molecular sieves, such as zeolites, AlPOs, and mesoporous materials, are ordered, porous crystalline materials having a definite crystalline structure as determined by X-ray diffraction ("XRD"). Molecular sieves can be ordered and produce specific identifiable XRD patterns. Within certain molecular sieve materials are cavities interconnected by channels or pores. Within a particular type of molecular sieve, the pores are generally uniform in size. Pore size determines whether a molecule can travel within the molecular sieve and be adsorbed or rejected.

Molecular sieves are utilized in a variety of industrial processes, e.g., cracking, hydrocracking, disproportionation, alkylation, oligomerization, and isomerization. Molecular sieves, including naturally occurring or the synthetic crystalline molecular sieves, can find application in catalysis and adsorption.

Synthesis of molecular sieve materials (zeolites) typically involves hydrothermal crystallization from a synthesis mixture comprising sources of all the elements present in the molecular sieve (or zeolite) such as sources of silica but also of alumina etc. In many cases a structure directing agent ("SDA") is also present. Structure directing agents are compounds which are believed to promote the formation of a molecular sieve and which are thought to act as templates around which certain molecular sieve structures can form and which thereby promote the formation of the desired molecular sieve. Various compounds have been used as structure directing agents including various types of quaternary ammonium cations. Typically, molecular sieve (zeolite) crystals form around structure directing agents with the structure directing agent occupying pores in the molecular sieve once crystallization is complete. The "as-synthesized" (or "as-made") molecular sieve will therefore contain the structure directing agent in its pores so that, following crystallization, the "as-synthesized" molecular sieve is subjected to a treatment step such as a calcination step to remove the structure directing agent.

As used herein, a "crystalline microporous material of the MWW framework type" or "as-synthesized MWW-type zeolite" includes one or more of:

(1) molecular sieves made from a common first-degree crystalline building block unit cell, which unit cell has the MWW framework topology. (A unit cell is a spatial arrangement of atoms which if tiled in three-dimensional space describes the crystal structure. Such crystal structures are discussed in the "Atlas of Zeolite Framework Types," Fifth edition, 2001, the entire content of which is incorporated as reference);

(2) molecular sieves made from a common second-degree building block, being a 2-dimensional tiling of such MWW framework topology unit cells, forming a monolayer of one unit cell thickness, preferably one c-unit cell thickness;

(3) molecular sieves made from common second-degree building blocks, being layers of one or more than one unit cell thickness, wherein the layer of more than one unit cell thickness is made from stacking, packing, or binding at least two monolayers of MWW framework topology unit cells. The stacking of such second-degree building blocks can be in a regular fashion, an irregular fashion, a random fashion, or any combination thereof; and (4) molecular sieves made by any regular or random 2-dimensional or 3-dimensional combination of unit cells having the MWW framework topology.

Crystalline microporous materials of the MWW framework type include those molecular sieves having an X-ray diffraction pattern including d-spacing maxima at 12.4±0.25, 6.9±0.15, 3.57±0.07 and 3.42±0.07 Angstrom. The X-ray diffraction data used to characterize the material are obtained by standard techniques using the K-alpha doublet of copper as incident radiation and a diffractometer equipped with a scintillation counter and associated computer as the collection system.

Examples of crystalline microporous materials of the MWW framework type I or as-synthesized MWW-type zeolite include MCM-22 (described in U.S. Pat. No. 4,954,325), PSH-3 (described in U.S. Pat. No. 4,439,409), SSZ-25 (described in U.S. Pat. No. 4,826,667), ERB-1 (described in European Patent No. 0293032), ITQ-1 (described in U.S. Pat. No. 6,077,498), ITQ-2 (described in International Patent Publication No. WO97/17290), MCM-36 (described in U.S. Pat. No. 5,250,277), MCM-49 (described in U.S. Pat. No. 5,236,575), MCM-56 (described in U.S. Pat. No. 5,362,697), UZM-8 (described in U.S. Pat. No. 6,756,030), UZM-8HS (described in U.S. Pat. No. 7,713,513), UZM-37 (described in U.S. Pat. No. 7,982, 084; EMM-10 (described in U.S. Pat. No. 7,842,277), EMM-12 (described in U.S. Pat. No. 8,704,025), EMM-13 (described in U.S. Pat. No. 8,704,023), MIT-1 (described by Luo et al in *Chem. Sci.,* 2015, 6, 6320-6324) and mixtures thereof.

In an embodiment, the crystalline microporous material of the MWW framework type can be an aluminosilicate material having a silica to alumina molar ratio of at least 10, such as at least 10 to less than 50.

As provided herein, the crystalline microporous material of the MWW framework type can be contaminated with other crystalline materials, such as ferrierite or quartz. These contaminants may be present in quantities <10% by weight, normally <5% by weight.

As provided herein, a new process has been developed to produce an alkylated naphthalene blendstock ("AN blendstock") having a kinematic viscosity at 100° C. ("KV100") that falls in between AN5 blendstock and AN12 blendstock. This process is catalyzed with a commercial zeolite material modified with an ion exchange process described herein. The catalyst used in the present process is less corrosive in comparison with a homogeneous triflic catalyst. Further, the resulting alkylated naphthalene blendstock (referred to herein sometimes as "MidVis AN blendstock") has a combination of the performance benefits of AN5 blendstock and AN12 blend stock. The present blendstock is useful in synthetic circulating and gear oils and other lubricant formulations as described herein.

Advantages of the present processes include a new catalyst that is less corrosive and does not require additional investment in specialized equipment metallurgy to use. Another advantage is the present process is that a one step process will provide an equivalent blendstock to that of prior art two-step processes. A third advantage of the present process is the production of a single formulation without the need to blend two or more alkylated naphthalene blendstocks.

Zeolite MCM-22

As described in U.S. Pat. No. 4,954,325, an as-synthesized MWW-type zeolite MCM-22 ("as-synthesized MCM-22") is not contaminated with other crystal structures and exhibits strong sorption capacities and catalytic utility compared to that of PSH-3. U.S. Pat. No. 4,954,325 at Col. 2, 1s. 21-32. MCM-22 zeolite ("MCM-22") has a composition with a molar relationship: $X_2O_3$:(n)$YO_2$ wherein X is a trivalent element, such as aluminum, boron, iron and/or gallium, Y is a tetravalent element such as silicon and/or germanium, and n is at least about 10 or from about 10 to about 150, about 10 to about 60, and about 20 to about 40. In an as-synthesized form and on an anhydrous basis, MCM-22 has a formula in terms of moles of oxides per n moles of $YO_2$ as follows: (0.005-0.1) $Na_2O$:(1-4)R:$X_2O_3$:n$YO_2$ wherein R is an organic moiety. U.S. Pat. No. 4,954, 325 at Col. 2, 1s. 40-56, incorporated herein by reference.

MCM-22 can be prepared from a reaction mixture containing: (1) alkali or alkaline earth metal (M) such as sodium or potassium; (2) cation; (3) an oxide of trivalent element X (i.e., aluminum); (4) an oxide of tetravalent element Y, (i.e., silicon); (5) an organic (R) directing agent; and (6) water. The reaction mixture has a reaction mixture composition in terms of mole ratios of oxides within the following ranges.

TABLE 1

Reactants to Produce As-Synthesized MCM-22 Zeolite

| Reactants | Useful | Preferred |
|---|---|---|
| $YO_2/X_2O_3$ | 10-80 | 10-60 |
| $H_2O/YO_2$ | 5-100 | 10-50 |
| OH—/$YO_2$ | 0.01-1.0 | 0.1-0.5 |
| M/$YO_2$ | 0.01-2.0 | 0.1-1.0 |
| R/$YO_2$ | 0.05-1.0 | 0.1-0.5 |

To synthesize MCM-22, the source of $YO_2$ must be comprised predominately of solid $YO_2$ or at least about 30 wt % solid $YO_2$. When $YO_2$ is silica, a silica source contains at least about 30 wt % solid silica. Ultrasil is a precipitated, spray dried silica containing about 90 wt % silica. HiSil is a precipitated hydrated SiO2 containing about 87 wt % silica, about 6 wt % free $H_2O$ and about 4.5 wt % bound $H_2O$ of hydration with a particle size of about 0.02 micro and favors crystal formation from the above mixture. On the other hand, if another source of oxide of silicon such as Q-Brand (a sodium silicate comprised of about 28.8 wt % SiO2, 8.9 wt % $Na_2O$ and 62.3 wt % $H_2O$) is used, crystallization yields little or no MCM-22 and contains impurity phases of other crystal structures, (i.e., ZSM-12) are prepared in the latter circumstance. Therefore, the source of $YO_2$ contains at least about 30 wt % solid $YO_2$ silica, or at least about 40 wt % solid $YO_2$ silica. U.S. Pat. No. 4,954,325 at Col. 5, 1s. 14-55.

Crystallization can be performed in a suitable reactor vessel such as polypropylene jars or teflon lined or stainless steel autoclaves. The total useful range of temperatures for crystallization is between about 80° C. and about 225° C. for a time sufficient for crystallization to occur at the temperature between about 24 hours and about 60 days. Thereafter, solids (crystals) are separated from the liquid and recovered. The organic directing agent is hexamethyleneimine or azepane. U.S. Pat. No. 4,954,325 at Col. 5, 1s. 56-67. Synthesis is facilitated by the presence of at least 0.01%, 0.10% and 1% of seed crystals (based on total weight) of MCM-22 product produced. U.S. Pat. No. 4,954,325 at Col. 6, 1s. 16-19.

Crystalline material, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While sub-atmospheric pressure can be employed for the thermal treatment, atmospheric pressure is desired. The thermal treatment can be performed at a temperature up to about 925° C. U.S. Pat. No. 4,954,325 at Col. 4, 1s. 59-68. The thermal treated MCM-22 product is useful as a catalyst in hydrocarbon conversion reactions. The MCM-22 crystalline material, when employed either as an adsorbent or as a catalyst in an organic compound conversion process should be dehydrated, at least partially. This can be done by heating to a temperature in the range of 200° C. to 595° C. in an atmosphere such as air, nitrogen, etc. and at atmospheric, sub-atmospheric or super-atmospheric pressures for between 30 minutes and 48 hours. Dehydration can also be performed at room temperature merely by placing the silicate in a vacuum, but additional time is required for dehydration. U.S. Pat. No. 4,954,325 at Col. 5, 1s. 1-13.

Zeolite MCM-49

As described in U.S. Pat. No. 5,236,575, an as-synthesized MWW-type zeolite MCM-49 (also referred to herein as "zeolite MCM-49" and "MCM-49") has a composition with a molar relationship as follows: $X_2O_3$: (n)$YO_2$ wherein X is a trivalent element, such as aluminum, boron, iron and/or gallium; Y is a tetravalent element such as silicon and/or germanium; and n is less than about 35, Between about 2 and about 35, between about 10 and about 35, between about 15 and about 31. U.S. Pat. No. 5,236,575 at Col. 2, 1s 67-68. In the as-synthesized form, the material has a formula, on an anhydrous basis and in terms of moles of oxides per n moles of $YO_2$, as follows: (0.1-0.6)$M_2O$:(1-4) R:$X_2O_3$:n$YO_2$ wherein M is an alkali or alkaline earth metal, and R is an organic moiety. The M and R components are associated with the material as a result of their presence during crystallization and are easily removed by post-crystallization methods described in U.S. Pat. No. 5,236,575 at Col. 3, 1s 1-20.

Crystalline material can be prepared from a reaction mixture containing sources of: alkali or alkaline earth metal (M); cation; an oxide of trivalent element X; an oxide of tetravalent element Y; directing agent (R); and water. The composition of the reaction mixture in terms of mole ratios of oxides is within the following ranges.

TABLE 2

Reactants to Produce As-Synthesized MCM-49 Zeolite

| Reactants | Useful | Preferred |
|---|---|---|
| $YO_2/X_2O_3$ | 12 to <35 | 18 to 31 |
| $H_2O/Y_2O$ | 10 to 70 | 15 to 40 |
| OH—/$YO_2$ | 0.05 to 0.50 | 0.05 to 0.30 |
| M/$YO_2$ | 0.05 to 3.0 | 0.05 to 1.0 |
| R/$YO_2$ | 0.2 to 1.0 | 0.3 to 0.5 |

In this synthesis method, if more than one X component is present, at least one must be present such that the $YO_2/X_2O_3$ molar ratio thereof is less than about 35. For example, if aluminum oxide and gallium oxide components are used in the reaction mixture, at least one of the $YO_2/Al_2O_3$ and $YO_2/Ga_2O_3$ molar ratios must be less than about 35. If only aluminum oxide has been added to the reaction mixture as a source of X, the $YO_2/Al_2O_3$ ratio must be less than about 35.

Also, the source of $YO_2$ is predominantly of solid $YO_2$, for example at least about 30 wt % solid $YO_2$ in order to obtain the crystal product of the containing at least about 30 wt % solid silica such as Ultrasil, a precipitated, spray dried silica containing about 90 wt % silica or HiSil, a precipitated hydrated SiO2 containing about 87 wt % silica, about 6 wt % free $H_2O$ and about 4.5 wt % bound $H_2O$ of hydration and having a particle size of about 0.02 micron which favors crystalline MCM-49 formation.

A directing agent R is selected from the group consisting of cycloalkylamine, azacycloalkane, diazacycloalkane, and mixtures thereof, alkyl comprising from 5 to 8 carbon atoms. Non-limiting examples of R include cyclopentylamine, cyclohexylamine, cycloheptylamine, hexamethyleneimine, heptamethyleneimine, homopiperazine, and combinations thereof. U.S. Pat. No. 5,236,575 at Col. 6, 1s 24-68, at Col. 7, 1s. 1-2.

Synthesizing MCM-49 can be facilitated by the presence of at least 0.01 percent, 0.10 percent and percent of seed crystals based on total weight of crystalline product. Useful seed crystals include MCM-22 and/or MCM-49. U.S. Pat. No. 5,236,575 at Col. 7, 1s 19-23. Also, MCM-49 can be transformed to another form by thermal treatment generally performed by heating at a temperature of at least about 370° C. for at least 1 minute and not longer than 20 hours. While sub-atmospheric pressure can be employed for the thermal treatment, atmospheric pressure is desired for reasons of convenience. The thermal treatment can be performed at a temperature up to about 925° C. U.S. Pat. No. 5,236,575 at Col. 5, 1s 59-67. When employed either as an adsorbent or as a catalyst in an organic compound conversion process, MCM-49 should be dehydrated, at least partially. This can be done by heating to a temperature in the range of 200° C. to about 370° C. in an atmosphere such as air, nitrogen, etc. and at atmospheric, sub-atmospheric or super-atmospheric pressures for between 30 minutes and 48 hours. Dehydration can also be performed at room temperature merely by placing MCM-49 in a vacuum, but a longer time is required to obtain dehydration. U.S. Pat. No. 5,236,575 at Col. 6, 1s 13-23.

Blendstocks

AN5 blendstock is an API Group V alkylated naphthalene blendstock. The AN5 blendstock has high hydrolytic, thermal, and oxidative stability and is useful as a blendstock in synthetic lubricant applications that require high stability under extreme operating conditions. Table 3 below provides general properties of AN5 blendstock.

TABLE 3

AN5 Blendstock Properties

| Property | Typical Value | Test Based on |
|---|---|---|
| Specific Gravity (15.6° C.) | 0.908 | ASTM D4052 |
| Appearance | Bright & Clear | Visual |
| Color | <1.5 | ASTM D1500 |
| Kinematic Viscosity | | ASTM D445 |
| 100° C. | 4.7 cSt | |
| 40° C. | 29.0 cSt | |
| −40° C. | 43600 cSt | |
| Viscosity Index | 74 | ASTM D2270 |
| Pour Point | −39° C. | ASTM D5949M/ D5950/D97 |
| Flash Point, COC | 222° C. | ASTM D92 |
| Nock Volatility | 12.7 wt % | ASTM D5800/ DIN 51581 |
| Bromine Number | <1.3 g Br/100 g | ASTM D1159 (mod) |
| Water | <50 ppm | ASTM E1064 |
| Refractive Index (25° C.) | 1.5220 | ASTM D1218 |
| Total Acid Number | <0.05 mg KOH/g | ASTM D974 (mod) |
| Hydrolytic Stability, TAN Change | 0.02 mg KOH/g | ASTM D2619 |
| Brookfield Viscosity | | ASTM D2983 |
| −26° C. | 3950 cP | |
| −40° C. | 29000 cP | |
| Density Correction Factor | 5.27E−4(g/cm$^3$)/° C. | ASTM D1250 |
| Fire Point, COC | 256° C. | ASTM D92 |
| Flash Point, PMCC | 192° C. | ASTM D93 |
| Evaporation Loss (205° C., 6.5 hr) | 15.6 wt % | ASTM D972 (mod) |
| RPVOT | | ASTM D2272 |
| Neat | 196 min | |
| With AO* | >1400 min | |
| Dielectric Strength | 49.0 kV | ASTM D877 |
| Aniline Point | 32.0° C. | ASTM D611 |
| Kauri-Butanol Value | 31.0 | ASTM D1133 |
| Elastomer Compatibility: Fluoroelastomer | | |
| Volume Change | 0.8% | ASTM D471 |
| Hardness Change | 0 | ASTM D471 |
| Tensile Strength Change | 1.9% | ASTM D471 |
| Elongation Change | −6.0% | ASTM D471 |
| Elastomer Compatibility: Nitrile | | |
| Volume Change | 14.1% | ASTM D471 |
| Hardness Change | −9 | ASTM D471 |
| Tensile Strength Change | −27.8% | ASTM D471 |
| Elongation Change | −25.6% | ASTM D471 |

TABLE 3-continued

| AN5 Blendstock Properties | | |
|---|---|---|
| Property | Typical Value | Test Based on |
| Elastomer Compatibility: Polyacrylate | | |
| Volume Change | 17.9% | ASTM D471 |
| Hardness Change | −11 | ASTM D471 |
| Tensile Strength Change | −6.6% | ASTM D471 |
| Elongation Change | −27.2% | ASTM D471 |

*1 percent diphenylamines and phenylnaphthlamine antioxidant added.

AN12 blendstock is an API Group V alkylated naphthalene blendstock. Like AN5 blendstock, the AN12 blendstock has high hydrolytic, thermal, and oxidative stability and is useful as a blendstock in synthetic lubricant applications that require high stability under extreme operating conditions. Table 4 below provides general properties of AN12 blendstock.

TABLE 4

| AN12 Blendstock Properties | | |
|---|---|---|
| Property | Typical Value | Test Based on |
| Specific Gravity (15.6° C.) | 0.887 | ASTM D4052 |
| Appearance | Bright & Clear | Visual |
| Color | <4.0 | ASTM D1500 |
| Kinematic Viscosity | | ASTM D445 |
| 100° C. | 12.4 cSt | |
| 40° C. | 109 cSt | |
| −40° C. | 392500 cSt | |
| Viscosity Index | 105 | ASTM D2270 |
| Pour Point | −36° C. | ASTM D5949M/ D5950/D97 |
| Flash Point, COC | 258° C. | ASTM D92 |
| Nock Volatility | 4.5 wt % | ASTM D5800/ DIN 51581 |
| Bromine Number | <1.0 g Br/100 g | ASTM D1159 (mod) |
| Water | <50 ppm | ASTM E1064 |
| Refractive Index (25° C.) | 1.5060 | ASTM D1218 |
| Total Acid Number | <0.05 mg KOH/g | ASTM D974 (mod) |
| Hydrolytic Stability, TAN Change | 0.02 mg KOH/g | ASTM D2619 |
| Brookfield Viscosity (−26° C.) | 22000 cP | ASTM D2983 |
| Density Correction Factor | 5.40E−4 $(g/cm^3)$/° C. | ASTM D1250 |
| Fire Point, COC | 290° C. | ASTM D92 |
| Flash Point, PMCC | 240° C. | ASTM D93 |
| Evaporation Loss (205° C., 6.5 hr) | 6.3 wt % | ASTM D972 (mod) |
| RPVOT | | ASTM D2272 |
| Neat | 180 min | |
| With AO* | >1400 min | |
| Dielectric Strength | 50.0 Kv | ASTM D877 |
| Aniline Point | 90.0° C. | ASTM D611 |
| Kauri-Butanol Value | 10.0 | ASTM D1133 |

TABLE 4-continued

| AN12 Blendstock Properties | | |
|---|---|---|
| Property | Typical Value | Test Based on |
| Elastomer Compatibility: Fluoroelastomer | | |
| Volume Change | 0.4% | ASTM D471 |
| Hardness Change | 0 | ASTM D471 |
| Tensile Strength Change | 5.0% | ASTM D471 |
| Elongation Change | −0.1% | ASTM D471 |
| Elastomer Compatibility: Nitrile | | |
| Volume Change | 0.1% | ASTM D471 |
| Hardness Change | 3 | ASTM D471 |
| Tensile Strength Change | −12.7% | ASTM D471 |
| Elongation Change | −21.4% | ASTM D471 |
| Elastomer Compatibility: Polyacrylate | | |
| Volume Change | 1.2% | ASTM D471 |
| Hardness Change | 2 | ASTM D471 |
| Tensile Strength Change | 15.7% | ASTM D471 |
| Elongation Change | −24.8% | ASTM D471 |

*1 percent diphenylamines and phenylnaphthlamine antioxidant added.

Table 5 below compares performance attributes for alkylated naphthene AN5 blendstock and AN12 blendstock. Oxidation stability of a blendstock is described in WO2016/0416647. As described in WO2011/041647, an oxidation test determines the amount time for a lubricant to degrade from oxidation or break to a catastrophic increase in viscosity. To perform the test, a sample is placed in an oxidation cell together with various organometallic catalysts that are dissolved in solution and then placed into the test cell. The cell and its contents are placed in a heating block maintained at a specified temperature, and a measured volume of dried air is bubbled through the test cell held at a pressure ranging from 0 to 100 psig for the duration of the test, with an air flow rate up to 250 cc/min. A constant temperature block, equipped with an electric heater and thermostatic control capable of maintaining the temperature within 1° F. (0.5° C.) in the range of 200° F. (93° C.) to 450° F. (232° C.) is used to maintain the specified temperature. Periodically the test cell is sampled for viscosity, until the oil has oxidized, identified by a rapid increase in oil viscosity. The oil condition is examined by measuring its kinematic viscosity at 100° C. ("KV100"). Comparisons can then be made to the original kinematic viscosity at 100° C. Good performance in this test is evidenced by little or no viscosity increase at end of test. Typically, a high viscosity blendstock has a KV of at least 100 cSt. A low viscosity base stock has a KV of less than 2 cSt. Kinematic viscosity is determined by ASTM D-445 method by measuring the time for a volume of liquid to flow under gravity through a calibrated glass capillary viscometer.

TABLE 5

| Comparative Performance Attributes AN5 Blendstock and AN12 Blendstock | |
|---|---|
| AN5 has a high mono alkylate (MA) content | AN12 has a low MA content and a high di- and tri alkylate content (DA, TA) |
| Higher solvency due to higher aromatic content | Lower solvency due to lower aromatic content |
| Higher oxidation stability | Lower oxidation stability |
| High amounts of mono-alkylate can cause seal swell. On the other hand, the oxidative stability of AN5 compared to AN12 is significant. Limited seal swell is good | High di alkylate content and tri alkylate contact is not harmful to seals and provides a low amount of seal swell. For 20% alkylated naphthalene in a formulation, di-alkylated naphthalene is required. |

TABLE 5-continued

| Comparative Performance Attributes AN5 Blendstock and AN12 Blendstock | |
|---|---|
| because it helps seal performance. Combinations of AN5 and AN12 are often used to bring the combined benefit to the formulation. | Therefore, AN12 blendstock is often used in combinations with AN5 blendstock to counter act the high seal swell of AN5 blendstock. |

Ion Exchange Processing: Zeolite MCM-22 and Zeolite MCM-49

As provided herein, economically feasible zeolite catalyst systems which can alkylate naphthalene to the desired isomer ratios with acceptable yields have been identified. These new catalyst systems enable the production of an alkylated naphthalene blendstock (an "AN blendstock") which closely matches the isomer distributions of the AN5 blendstock and the AN12 blendstock when combined. The mono-alkylate naphthalene ("MA") to di-alkylate naphthalene ("DA") plus tri-alkylate naphthalene ("TA") ratio is equivalent to the same ratio in a combined blendstock which contains 35% AN5 blendstock and 65% AN12 blendstock and the cost of production can be significantly reduced. For example, the MA to (DA+TA) ratio in the AN blendstock provided herein is approximately 40% MA to 60% (DA+TA) similar to a combination of 35% wt % of AN5 blendstock and 65% wt % AN12 blendstock that has approximately 40% MA and approximately 60% DA+TA.

The present processes for producing the AN blendstock are catalyzed with one or more commercially available zeolites modified with an ion exchange process to provide a modified zeolite referred to herein as an "acid-form zeolite" or "MWW-type acid-form zeolite." The acid-form zeolite is less corrosive than triflic acid. To provide the acid-form zeolite, an as-synthesized zeolite is transformed from basic to acidic by removing alkali metals. By catalyzing the process of making an alkylated naphthalene blendstock with the acid-form zeolite, the AN blendstock combines the performance benefits from AN5 blendstock and AN12 blendstock.

As described in U.S. Pat. No. 3,140,251, the removal of alkali metals was performed by contacting the zeolite crystals with ammonium salt solution (e.g., ammonium nitrate, ammonium chloride) capable of conversion to a hydrogen ion, until the metallic cations originally present in the zeolite have reached the desired concentration or are virtually exhausted. Ion exchange can be performed in either batch (exchange column with recirculating solution), semi-batch (filter press), or continuous (horizontal belt filter or extractor) operation. Following the ion exchange process, the treated zeolite is washed with water until the effluent wash water has a pH value of wash water.

As described in the examples below, an as-synthesized MWW-type zeolites MCM-22 and MCM-49 (described above) were transformed into acid-form MWW-type zeolites via $NH_4^+$ exchange followed by calcination. The ion-exchange process to provide an acid-form MWW-type zeolite includes providing an aqueous solution of an ammonium salt, such as ammonium nitrate, ammonium chloride, or ammonium acetate, is contacted with the sodium form zeolite. The aqueous solution has a concentration of approximately 1 Molar. The zeolite is contacted with the aqueous solution in a stirred tank or via a filtration. Various types of filters can be used including a filter press or a belt filter, but other filter layouts are also possible. Ammonium solution in a significant amount must be used to ensure that the majority of sodium or other cations are removed from the crystal. Typically, a sodium content is less than 500 ppm by weight. After ion exchange, zeolite crystal should be washed with deionized water to remove excess ammonium solution. The filter is then dried at a temperature around 300° F. to remove any remaining water.

The zeolite is then calcined to remove any organics present as well as the adsorbed ammonium at a temperature between 500° C. and 700° C., with a preferred temperature of 500° C. and 600° C. A calcination step can proceed via a single step with an oxygen containing atmosphere from 1 wt % to 22 wt % $O_2$. Alternatively, the calcination step is a two-step process where the zeolite is first thermally treated in an inert atmosphere such as $N_2$, He, or Ar, followed by a heat treatment in an oxygen containing atmosphere (1% wt % to 22% wt % $O_2$). This heat treatment can occur in a fixed bed reactor or a rotary calciner. A calcination time of between 1 and 4 hours in a nitrogen atmosphere, followed by a calcination time of between 1 and 4 hours in an air atmosphere is used. A preferred calcination time is between 1 and 2 hours in a nitrogen atmosphere followed by a calcination time between 1 and 2 hours in an air atmosphere.

Key properties and features of the modified MWW-type zeolite (acid-form MWW-type zeolite), the product of the ion exchange and calcination of the as-synthesized MWW-type zeolite, include the modified MWW-type zeolite comprising less than 0.05 wt % carbon, less than 500 ppm wt % sodium and having a total surface area greater than 400 $m^2/g$ and external surface area greater than 65 $m^2/g$. The acid-form MWW-type zeolite has a surface acidity between 125 and 145 micromoles per gram per collidine uptake and a total acidity between 0.80 and 1.0 meq/g as measured by TPAD.

Temperature programmed ammonia desorption ("TPAD") is a measure of the acidity of a zeolite or catalyst composition. For the present TPAD analysis, a catalyst sample (0.2 g) was first dried at 500° C. for 3 hours under a helium (He) flow rate of 10 cc/min. The temperature was then reduced to 100° C. whereupon the catalyst sample was saturated with ammonia gas. After saturation with ammonia gas, the catalyst sample was desorbed at 100° C. with helium flow to desorb physisorbed ammonia from the catalyst sample. TPAD was performed at a desorption temperature ramp of 18.4° C./min under helium flow rate of 16 cc/min. The desorbed ammonia and water (if any) were monitored during the TPAD as meq/g.

Collidine uptake is a measure of the acidity of a zeolite or catalyst composition. The collidine uptake of the zeolites and catalyst compositions was determined as the millimoles of collidine (a type of catalyst poison) absorbed per gram of a zeolite or catalyst composition sample that is dried under nitrogen flow at 200° C. for 60 minutes on a Thermogravametric Analyzer (Model Q5000, manufactured by TA Instruments, New Castle, Del.). After drying the catalyst sample, the collidine (as a catalyst poison) was sparged over the catalyst sample for 60 minutes at a collidine partial pressure of 3 torr. The collidine uptake was calculated from the following formula: (catalyst sample weight after sparging with collidine-dried catalyst sample weight)×106÷(molecular weight of collidine×dried catalyst sample weight).

MWW-type zeolites are known to be selective for mono-alkylation of naphthalene. However, we discovered that modifying the MWW-type zeolites to an acid-form MWW-type zeolite (the "acid-form zeolite") which has a surface acidity between 125 and 145 micromoles per gram per collidine uptake and a total acidity between 0.80 and 1.0 meq/g as measured by TPAD was unexpectedly useful in producing a blendstock having a mixture of mono and di- and tri-isomers. While previously thought not to be selective, the performance of an MWW-type zeolite having high surface acidity drove the amount of trialkylated naphthalene and ultimately the amount of multi-alkylates.

The Blendstock

A process for making an alkylated naphthalene blendstock having a KV100 that is between the KV100 of AN5 blendstock and AN12 blendstock is provided herein. In developing this process, the following assumptions were made: (a) x % $C_{14}$ mono alkylate naphthalene performs like x % $C_{16}$ mono alkylated naphthalene in a lubricant formulation; (b) x % $C_{14}$ dialkylated naphthalene performs like x % $C_{16}$ dialkylated naphthalene in a lubricant formulations; (c) x % $C_{14}$ dialkylated naphthalene performs like x % $C_{14}$ trialkylated naphthalene in a lubricant formulation; (d) x % $C_{14}$ dialkylated naphthalene performs like x %

$C_{16}$ trialkylated naphthalene in a lubricant formulations; (e) x % $C_{16}$ dialkylated naphthalene performs like x % $C_{14}$ trialkylated naphthalene in a lubricant formulation; (f) x % $C_{16}$ dialkylated naphthalene performs like x % $C_{16}$ trialkylated naphthalene in a lubricant formulation; (g) x % $C_{14}$ trialkylated naphthalene performs like x % $C_{16}$ trialkylated naphthalene in a lubricant formulation; and (h) x % $C_{14}$ dialkylated naphthalene+y % $C_{14}$ trialkylated naphthalene perform like n % $C_{16}$ dialkylated naphthalene+m % $C_{16}$ trialkylated naphthalene (x+y=n+m) in a lubricant formulation.

Based on the foregoing assumptions, alkylated naphthalene ("AN") blendstocks including a $C_{14}$ AN blendstock and a $C_{16}$ AN blendstock were produced having an isomer ratio of <40% mono alkylated naphthalene and >60% multi-alkylated naphthalene (di+tri). In an embodiment, the AN blendstock comprises more than 30 wt % di-alkylated naphthalene. In an embodiment, the present AN blendstocks replaces the AN5 blendstock and the AN12 blendstock in a lubricant formulation. In an embodiment, the present AN blendstocks replace the AN12 blendstock and can be substituted partially for the AN5 blendstock in the lubricant formulation.

To produce a C14 AN blendstock and/or a C16 AN blendstock, the following schemes are shown immediately below:

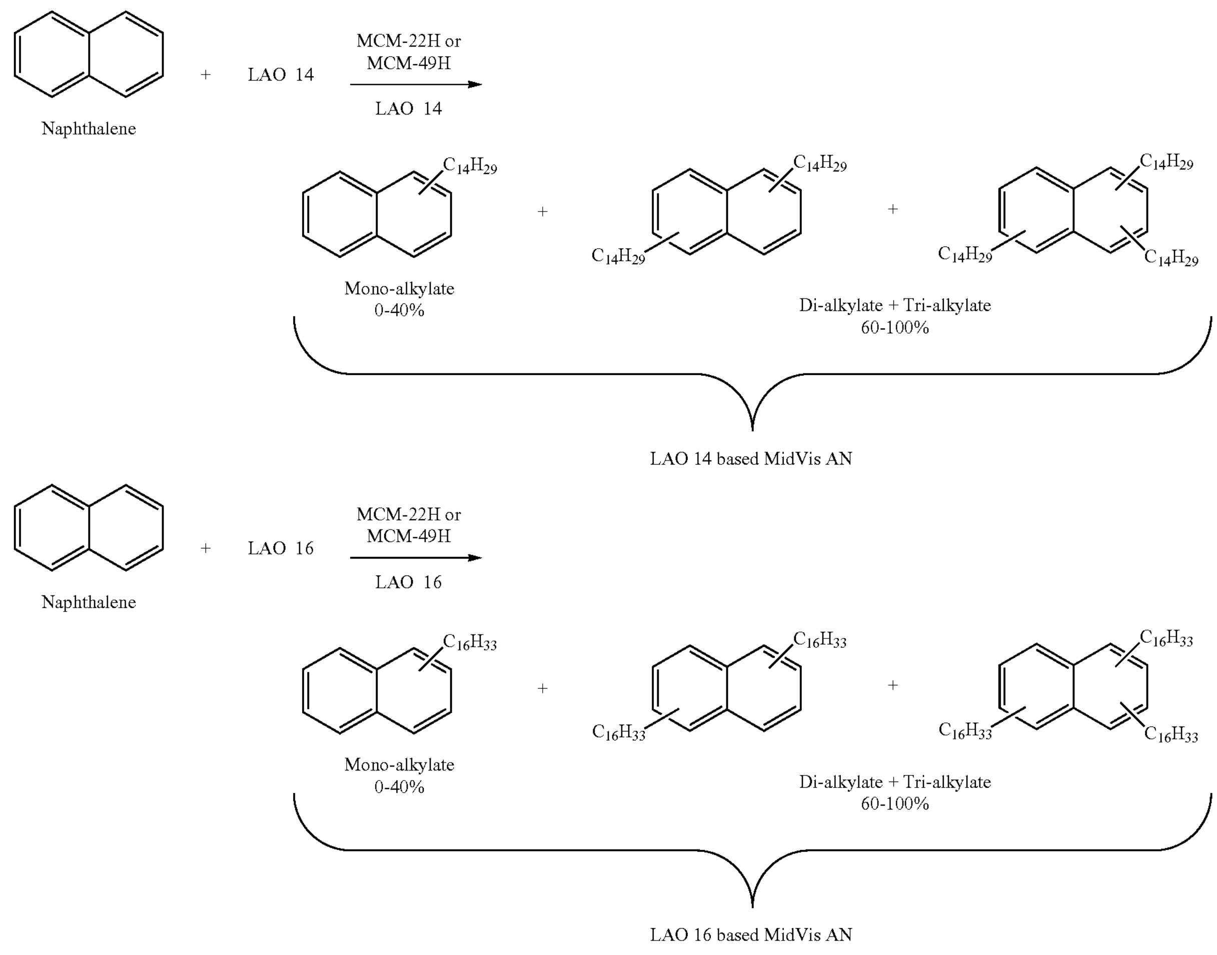

Processes to Produce the AN Blendstock

To produce the AN blendstock, naphthalene, linear alpha olefin ("LAO"), and the acid-form MWW-type zeolite (i.e., MCM-22H and/or MCM-49H) are fed to an alkylation reactor together with a solvent stream and a recycle stream from the vacuum distillation section. In an embodiment, this process is a batch process and utilizes a CSTR alkylation reactor and has a filtration section (1 micron), and a vacuum distillation section. In an embodiment, unreacted olefins, naphthalene, solvent and potentially mono alkylate are each recycled to the alkylation reactor via a recycle stream in fluid communication between the vacuum distillation section and the alkylation reactor. In an embodiment, the recycled components can be collected in a drum and fed to the reactor upon startup of the next batch. After the reaction is completed, neutralizer and filter aids are fed into the alkylation reactor. Solvents include but are not limited to Sasol 1012 solvent. Neutralizers and filter aids include but are not limited to lime, sodium carbonate, active carbon and Celite.

To produce the present AN blendstock, the alkylation reactor typically operates at atmospheric pressure between about 200° C. and 210° C. (375° F. and 410° F.). At this temperature and pressure, reaction time is generally about 2 hours to convert greater than 98.5% naphthalene feed to the reactor. Optionally, reaction pressures are generally ambient and reaction temperatures are between 200° C. and 210° C. to maximize yields and selectivity to highly alkylated naphthalene isomers without producing significant amounts of LAO oligomer co-products (LAO dimers, trimers). Lowering the reaction temperature leads to reduction in multi-alkylate selectivity. Raising the maximum temperature leads to formation of LAO oligomers (PAOs). Increasing the time at maximum temperature also increases the formation of LAO oligomers (PAOs). The olefin to naphthalene mole ratio also impacts multi alkylate selectivity and the degree of LAO oligomer formation. Increasing the mole ratio above optimum conditions (1.75 for LAO14 and 1.81 for LAO16) increases LAO oligomer formation. Decreasing it below optimum conditions reduces selectivity to multi alkylate molecules. Reaction times are variable depending on catalyst alkylation strength.

Typically, the CSTR reactor is loaded with naphthalene, a small amount of solvent and catalyst at 90° C. and then heated to 200° C. under stirring. Then olefin is continuously added to the hot naphthalene blend. The olefin addition rate is adjusted to take an hour. Then the reactor is quickly heated to 210° C. and the contents stirred for 1-3 hours (alkylation conditions). Significant mono-alkylate formation takes place during the olefin addition, but primarily alkylation to the di alkylate and tri alkylate happens at the higher temperature. The reactor effluent is distilled under vacuum to remove unreacted naphthalene, unreacted olefin, and solvent overhead. Naphthalene has tendency to precipitate in the overhead system. The small amount of added solvent helps solubilize naphthalene in the overhead system. The vacuum distillation section for $C_{16}$ AN blendstock operates at pressures between about 100 Torr and 3 Torr at temperatures between about 120° C. and 205° C. The vacuum distillation section for $C_{14}$ AN blendstock operates at pressures between about 100 Torr and 3 Torr at temperatures between about 120° C. and 180° C. Operating conditions in the experiments A to D represent optimized reaction conditions.

Table 6 sets out exemplary compositions of inputs and outputs of the alkylation reactor.

TABLE 6

| $C_{14}$ AN Blendstock | wt % | $C_{16}$ AN Blendstock | wt % |
|---|---|---|---|
| Inputs | | Inputs | |
| Naphthalene | 26.3 | Naphthalene | 23.2 |
| $LAO_{14}$ | 70.3 | $LAO_{16}$ | 73.4 |
| Zeolite catalyst (provided by EM) | 1.0 | Zeolite catalyst (provided by EM) | 1.0 |
| Sasol 1012 | 2.0 | Sasol 1012 | 2.0 |
| Neutralizer/filter aid | 0.4 | Neutralizer/filter aid | 0.4 |
| Total | 100 | Total | 100 |
| Outputs | | Outputs | |
| Solid waste | 3.5 | Solid waste | 3.5 |
| AN/naphthalene/LAO14/ Sasol 1012 (recycle) | 14.2 | AN/naphthalene/LAO16/ Sasol 1012 (recycle) | 11.3 |
| AN Product | 82.3 | AN Product | 85.2 |
| Total | 100 | Total | 100 |

The catalyst load has an impact on the isomer ratio. A higher catalyst load (more catalyst) increases selectivity towards multi-alkylated naphthalene products but at a higher production cost. Catalyst load can be minimized to produce the desired product selectivity and yield. In the lab reactor (Parr), a catalyst load was lowered to 1 wt % per reactor batch while maintaining a desired isomer ratio in the AN product of MA<45 wt % and multi alkylate>55 wt %. We believe that the catalyst load can be further reduced in a large commercial reactor due to the much lower hot surface to volume ratio. This must be verified in a plant test. Examples 2 to 5 list optimized conditions including olefin to naphthalene feed ratio, olefin addition rate, catalyst load, stirring rate (500 rpm), reaction temperature during olefin addition, reaction temperature during alkylation, time of alkylation, catalyst neutralization, catalyst removal with 1 micron filter, and fractionation conditions to meet target molecular properties. Generally, catalyst load is between about 0.1 wt % to 2.0 wt % of the total wt % of a feed to a reactor. The olefin to naphthalene feed ratio, the olefin addition rate, the catalyst load, the stirring rate, the reaction temperature during olefin addition, the reaction temperature during the final cook, the time of the final cook, the catalyst removal efficiency, and fractionation conditions each can be optimized to meet target molecular properties.

As shown in Tables 7A and 7B below, physical and structural properties of the AN blendstock produced fall in between the properties of AN5 blendstock and AN12 blendstock. As shown in Tables 7A and 7B, RPVOT, min was improved when 150 ppm L109 anti-oxidant was added.

TABLE 7A

| | AN12 | $C_{16}$ AN Blendstock | | $C_{14}$ AN Blendstock | |
|---|---|---|---|---|---|
| Experiment ID | SPEC | Exp. A | Exp. B | Exp. C | Exp. D |
| Olefin feed | LAO 14 | LAO 16 | LAO 16 | LAO 14 | LAO 14 |
| Catalyst | TFA | MCM 22-H | MCM 22-H | MCM 22-H | MCM 22-H |
| Catalyst producer | | Clinton 1 | Clinton 1 | Clinton 1 | Clinton 1 |

TABLE 7A-continued

| | | AN12 | $C_{16}$ AN Blendstock | | $C_{14}$ AN Blendstock | |
|---|---|---|---|---|---|---|
| Catalyst load | | 0.10% | 1.50% | 1.00% | 1.00% | 1.00% |
| KV100, cSt | D445 | 12-14 | 9.176 | 8.405 | 7.289 | 7.141 |
| KV40, cSt | D445 | 114 Target | 70.31 | 62.02 | 53.44 | 51.65 |
| VI | D2270 | 100 Min | 106 | 105 | 95 | 95 |
| PP, ° C. | D5950 | −30 C. Max | −36 | −33 | −54 | −54 |
| FP-PMCC, ° C. | D93 | 240 Typ | not tested | 215.5 (42) | not tested | 210 |
| FP-COC, ° C. | D92 | 230° C. Min | not tested | 237 (42) | not tested | 225 |
| Noack, % | D5800 | 4.5% Typ | 5.8 | 5.1 | 10.9 | not tested |
| RPVOT, min | D2272 | 180 Typ | 103 | 118 | 135 | 144 |
| CCS @ −35° C., cP | D5293 | 93,574 (spot test) | 40,574 | 31,314 | 30,708 | not tested |
| BF Vis @ −30° C., cp | D2983 | 41,900 (spot test) | 24,030 | 15,580 | 17,460 | not tested |
| Naphthalene (%) | Lo Vis GC | 0.090 Max | 0.00 | 0.00 | 0.01 | 0.00 |
| Olefins (%) | Lo Vis GC | 0.25 Max | 0.6 | 0.3 | 0.3 | 0.1 |
| MA, % | Lo Vis GC | 13.4 Target | 36.4 | 41.2 | 43.4 | 40.6 |
| DA, % | Lo Vis GC | 34 Target | 43.0 | 43.5 | 41.3 | 43.7 |
| TA, % | Lo Vis GC | 53 Target | 19.9 | 15.1 | 15.0 | 15.6 |
| Br#, g Br/100 g | D1159 (mod) | 1 Max | 1.0 | 1.1 | 1.2 | 1.1 |

TABLE 7B

| | | AN5 | $C_{16}$ AN Blendstock | | $C_{14}$ AN Blendstock | |
|---|---|---|---|---|---|---|
| Experiment ID | | SPEC | Exp. A | Exp. B | Exp. C | Exp. D |
| Olefin feed | | LAO 16 | LAO 16 | LAO 16 | LAO 14 | LAO 14 |
| Catalyst | | CFG-1 | MCM 22-H | MCM 22-H | MCM 22-H | MCM 22-H |
| Catalyst producer | | Zeolyst | Clinton 1 | Clinton 1 | Clinton 1 | Clinton 1 |
| Catalyst load | | 1.50% | 1.50% | 1.00% | 1.00% | 1.00% |
| KV100, cSt | D445 | 5.10 Max | 9.176 | 8.405 | 7.289 | 7.141 |
| KV40, cSt | D445 | 26.5-31.0 | 70.31 | 62.02 | 53.44 | 51.65 |
| VI | D2270 | 70 Min | 106 | 105 | 95 | 95 |
| PP, ° C. | D5950 | −33° C. Max | −36 | −33 | −54 | −54 |
| FP-PMCC, ° C. | D93 | 192° C. Typ | not tested | 215.5 (42) | not tested | 210 |
| FP-COC, ° C. | D92 | 210° C. Min | not tested | 237 (42) | not tested | 225 |
| Noack, % | D5800 | 12.7% Typ | 5.8 | 5.1 | 10.9 | not tested |
| RPVOT, min | D2272 | 196 Typ | 103 | 118 | 135 | 144 |
| CCS @ −35° C., cP | D5293 | 11,514 (spot test) | 40,574 | 31,314 | 30,708 | not tested |
| BF Vis @ −30° C., cp | D2983 | 6,110 (spot test) | 24,030 | 15,580 | 17,460 | not tested |
| Naphthalene (%) | Lo Vis GC | 0.090 Max | 0 | 0 | 0.01 | 0 |
| Olefins (%) | Lo Vis GC | 1.0 Max | 0.6 | 0.3 | 0.3 | 0.1 |
| MA, % | Lo Vis GC | 88 Min | 36.4 | 41.2 | 43.4 | 40.6 |
| DA, % | Lo Vis GC | 12 Max | 43 | 43.5 | 41.3 | 43.7 |
| TA, % | Lo Vis GC | NA | 19.9 | 15.1 | 15 | 15.6 |
| Br#, g Br/100 g | D1159 (mod) | 1.3 Max | 1 | 1.1 | 1.2 | 1.1 |

Lubricant Formulations

The present lubricant formulations are generally formulated from synthetic base stocks having a high viscosity index. The present lubricant formulation (a synthetic lubricant formulation) features low fluid friction to provide rust and corrosion protection, bearing wear protection (i.e., low FAG FE8 bearing testing score), reduced power consumption, demulsibility, and foam control and air-release properties.

Alkylated naphthalene synthetic blendstocks (also referred to sometimes as "co-basestocks") are solubility enhancers used in lubricant formulations across a range of applications. For example, engine oils (diesel and gasoline) contain 1 wt % to 5 wt % of alkylated naphthalene to improve additive solubility and mitigate sludge formation. In the industrial applications, alkylated naphthalene is used in circulating and compressor oils for use in severe operating conditions and to provide long oil drain intervals. In these applications, alkylated naphthalene is commonly used between 10 wt % and 65 wt % of the overall formulation. Alkylated naphthalene can also be used in power generating equipment (gas and steam turbines) at concentrations of between 1 wt % and 10 wt %. In these applications, the alkylated naphthalene provides solubility and varnish mitigation benefits. Gear oils also use alkylated naphthalene as a co-blendstock to improve additive solubility when used between 1 wt % and 15 wt % of the lubricant formulation. Similarly, hydraulic oils rely on alkylated naphthalene for particularly sever applications in amounts up to 20 wt % of the overall formulation.

As provided herein, the present lubricant formulations comprise one or more polyalphaolefins base stocks ("PAO base stocks") and one or more AN blendstocks. Generally, PAO base stocks are used in automotive fluids as well as hydraulic, gear and bearing oils, working in extremely cold climates or hot applications. PAO base stocks are also employed as base fluids in some wide temperature range greases. PAO base stocks, however, shrink seals and cannot dissolve common oil additives. Therefore, the PAO base stock is combined or blended with the blendstock to provide the lubricant formulation.

As provided herein, the PAO base stock of the present lubricant formulations can be a conventional PAO base stock and/or a metallocene PAO base stock. Generally, poly alpha olefins ("PAOs") are manufactured through a synthetic chemical process that originates from ethylene produced by cracking either crude oil or natural gas. Poly alpha olefins produced in and exiting from a reactor are olefins. Downstream hydrogenation converts poly alpha olefins into hydrogenated PAO. These PAOs do not contain ring structures, double bonds, sulphur, nitrogen components or waxy hydrocarbons. The absence of these structures and materials results in a non-polar base oil with a high viscosity index, excellent low-temperature flow and pour-point characteristics, good oxidation stability and compatibility with mineral oils, paints and seals commonly found in lube oil systems. Because of the controlled structure, PAOs do not contain lighter, more volatile (small) hydrocarbons, lowering volatility, raising the flash point, and create less hydrocarbon tailpipe emissions.

Conventional polyalphaolefins ("conventional PAOs") are homo-polymers made from a single alpha-olefin, typically LAO8, LAO10, or LAO12. Conventional PAOs can also be co-polymers made from two or more alpha-olefins, typically LAO8, LAO10, or LAO12. Typically, the kinematic viscosity at 100° C. ranges from 1 to 100. The viscosity index of the conventional PAO ranges from 100-200. Conventional PAOs can be produced using a BF3 catalyst systems. Typically, BF3 is activated with one or more promotors including alcohols like methanol, ethanol, propanol, butanol and other alcohols. Often moderators are added such as acetates like ethyl acetate, butyl acetate and others.

Metallocene polyalphaolefins ("mPAOs") are a co-polymer made from at least two alpha-olefins or more, or a homo-polymer made from a single alpha-olefin feed, or a homo-polymer made from a single alpha-olefin feed by a metallocene catalyst system. WO2011/041647 at ¶ [0026]. In an embodiment, the activated metallocene catalyst used to produce the PAOs can be a simple metallocene, substituted metallocene or bridged metallocene catalyst activated or promoted by, for instance, methylaluminoxane (MAO) or a non-coordinating anion, such as N,N-dimethylanilinium tetrakis(perfluorophenyl) borate or other equivalent non-coordinating anion and optionally with co-activators, typically trialkylaluminum compounds. WO2011/041647 at ¶ [0031].

Hybrid PAO is another class of PAO. Hybrid PAO is produced by combining a metallocene process step with a conventional BF3 process step. For example, in the metallocene process step, a single LAO ($C_6$, $C_8$, $C_{10}$, $C_{12}$, $C_{14}$, or $C_{16}$) is dimerized to a LAO dimer olefin. This dimer plus other LAO monomers are fed into a BF3 reactor where they are copolymerized to produce the hybrid PAOs. The process of making hybrid PAOs can produce a multitude of different products which can be blended with the AN blendstock in lubricant formulations.

By way of example, in an embodiment, a mixed feed of linear alpha olefins ("LAOs") comprising at least two and up to 26 different linear alpha-olefins selected from $C_3$ to $C_{30}$ LAOs is used to make the mPAO base stock. The mixed feed LAOs are obtained from an ethylene growth process using an aluminum catalyst or a metallocene catalyst (also called Ziegler-Nata catalyst). The growth olefins comprise $C_6$ to $C_{18}$ LAOs. In an embodiment, a treatment step is performed to remove peroxides, oxygen, sulfur, nitrogen-containing organic compounds, and acetylenic compounds from the catalyst. See e.g., WO2011/041647 at ¶¶ [0032] & [0056].

To make the present lubricant formulations, the at least one alkylated naphthalene blendstock is blended with the one or more PAO base stock. In an embodiment, the PAO base stock has a viscosity between about 2 centipoise ("cps") and 300 cps KV100° C. In addition, the PAO base stock comprises an amine antioxidant additive, a defoamant additive, and/or an inhibitor additive. In an embodiment, the lubricant formulation has a viscosity of at least 4 cps and less than 100 cps KV 100° C., between 10 ppm and 1000 ppm metal content, less than 100 ppm and up to 8000 ppm sulfur content, and a viscosity index ("VI") greater than 95.

Table 8 provides properties of exemplary lubricant formulations containing the AN5 blendstock and the AN12 blendstock used to enhance performance. The amount of alkylated naphthalene blendstock in the lubricant formulation can vary between (35+x) wt % AN5 blendstock and (65−x) wt % AN12 blendstock. Combined isomer ratios in the lubricant formulation will vary between (39+x) wt % mono-alkylated naphthalene and (61−x) wt % multi-alkylated naphthalene.

TABLE 8

| Exemplary Lubricant Formulation Properties | | | | | | | |
|---|---|---|---|---|---|---|---|
| Lubricant Formulation | A | B | C | D | E | F | Test |
| Viscosity | | | | | | | |
| cSt @ 40° C. | 68 | 100 | 150 | 220 | 320 | 460 | ASTM |
| cSt @ 100° C. | 11.6 | 15.3 | 21.1 | 28.5 | 38.5 | 50.7 | D445 |
| Viscosity Index | 165 | 162 | 166 | 169 | 172 | 174 | ASTM D2272 |
| Pour Point (° C.) | −51 | −45 | −39 | −36 | −33 | −30 | ASTM D5950 |
| Flash Point (° C.) | 225 | 235 | 220 | 220 | 225 | 228 | ASTM D92 |
| Density @ 15° C. (g/cc) | 0.86 | 0.86 | 0.86 | 0.87 | 0.87 | 0.87 | ASTM D4052 |
| Appearance | Orange | Orange | Orange | Orange | Orange | Orange | Visual |
| TOST (hours) | 10,000+ | 10,000+ | 10,000+ | 10,000+ | 10,000+ | 10,000+ | ASTM D943 mod |
| RPVOT (minutes) | 2500 | 2500 | 2500 | 2500 | 2500 | 2500 | ASTM D2272 |
| Rust Protection (synthetic Sea Water) | Pass | Pass | Pass | Pass | Pass | Pass | ASTM D665B |
| Water Separability | 15 | | | | | | ASTM |

TABLE 8-continued

| Exemplary Lubricant Formulation Properties | | | | | | | |
|---|---|---|---|---|---|---|---|
| Lubricant Formulation | A | B | C | D | E | F | Test |
| (Min. to 37 mL water @ 54° C.) | | | | | | | D1401 |
| Water Separability (Min. to 37 mL water @ 82° C.) | | 15 | 20 | 20 | 20 | 20 | ASTM D1401 |
| Copper Corrosion (24 hrs. @ 121° C.) | 1B | 1B | 1B | 1B | 1B | 1B | ASTM D130 |
| Foam Test, | 10/0 | 0/0 | 0/0 | 0/0 | 0/0 | 0/0 | ASTM |
| Seq I, II, & III | 20/0 | 10/0 | 0/0 | 0/0 | 0/0 | 0/0 | D892 |
| Tendency/Stability (mL/mL) | 10/0 | 0/0 | 0/0 | 0/0 | 0/0 | 0/0 | |
| FZG gear scuffing test, A/8.3/90, Failure Stage | 12 | 12 | 13 | 13+ | 13+ | 13+ | ISO 14635-1 mod |
| FAG FE8 Bearing Wear Test 7.5/80-80 Roller Wear (mg) | | 2 | 2 | 2 | 2 | 2 | DIN 51819-3 |

As described herein, the present AN blendstock reduces process costs to make the lubricant formulation while maintaining the performance benefits which are currently provided with the combination of AN5 blendstock and AN12 blendstock. By combining the present AN blendstock with a polyalphaolefin base stock, the method of making the lubricant formulation is performed without combining two blendstocks. The present methods of making the lubricant formulation omit and are performed without the step of making a second blendstock. The present methods of making the lubricant formulation do not require a triflic catalyst and the steps of the process are performed without the triflic catalyst. Likewise, the present methods of making the AN blendstock do not require a triflic catalyst. The present AN blendstock is made without the triflic catalyst. Furthermore, the present method of making the lubricant formulation (comprising the AN blendstock) is made in a single-step process or in a process that does not require a combination of two blendstocks. While an optional second basestock could be added to the present lubricant formulation, the present lubricant formulations do not require two or more blendstocks.

The advantages and benefits of using the present methods of making the lubricant formulation include reduced transportation of raw materials and improved economy of scale together with the added benefit of removing a per-fluorinated alkyl substance from the synthesis. The present AN blendstock offers solvency and oxidative benefits of AN5 blendstock and optimal elastomer compatibility of AN12 blendstock.

Aspects of the disclosure are described in greater detail by way of specific examples. The following examples are offered for illustrative purposes and are not intended to limit the disclosure in any manner. Those of skill in the relevant art will readily recognize a variety of parameters can be changed or modified to yield essentially the same results.

EXAMPLES

The features of the disclosure are described in the following non-limiting examples.

Example 1

Transformation of MCM-22 and MCM-49 into Acid-Form Zeolites MCM-22H & MCM-49H Samples of as-synthesized MWW-type zeolites MCM-22 and MCM-49 were transformed into acid-form zeolites ("MCM-22H" and "MCM-49H." respectively) via $NH_4^+$ exchange followed by calcination. Ion exchange was performed by contacting the zeolite with 0.5 to 1N ammonium nitrate solution but other ammonium salt solutions such as $NH_4Cl$ can also be used for the same purpose. Ion exchange can be performed in either batch (exchange column with recirculating solution), semi-batch (filter press), or continuous (horizontal belt filter or extractor) operation with the goal to remove sodium or other alkali metals from the as-synthesized zeolite crystal to low levels, typically <500 ppm. In a batch operation, fresh ammonium salt solution is used for each subsequent exchange until the desired alkali metal concentration is achieved. Ion exchange is performed at ambient temperatures and pressures.

Following ion exchange, the zeolite crystal is then washed with deionized water to remove residual ammonium salts prior to calcination. The zeolite crystal is first calcined in flowing nitrogen at 842° F. (450° C.) followed by calcination in a nitrogen/air mixture at 1000° F. (538° C.). The properties of the acid-form zeolite MCM-22H and MCH-49H are provided in Table 9 immediately below.

TABLE 9

Characterization of Ion-Exchanged and TOSOH Ion-Exchanged Zeolite (lab scale).

| | | Sample | | | | |
|---|---|---|---|---|---|---|
| | Test | TOSOH MCM-49 | TOSOH MCM-22 | Exxon MCM-22 | Exxon MCM-49 | Unit |
| ICP | Alumina | 7.12 | 5.85 | 5.34 | 6.83 | wt % |
| | Potassium | 0.02 | 0.02 | 0.02 | <0.01 | wt % |
| | Sodium | 0.02 | 0.04 | 0.02 | 0.01 | wt % |
| | Silica | 76.3 | 77.6 | 74.5 | 69.6 | wt % |
| | $Si/Al_2$ | 18.05 | 22.35 | 23.5 | 17.17 | |
| Coke on Catalyst | | 0.0644 | <0.050 | <0.050 | <0.050 | wt % |
| BET Surface Area | Total Surface area | 589.9 | 573 | 496.3 | 487.1 | $m^2/g$ |
| | External Surface Area | | 74.8958 | 92.5477 | 74.7382 | $m^2/g$ |
| | Micropore Surface Area | | 510.3548 | 403.7369 | 412.3986 | $m^2/g$ |
| | Micropore Volume | | 0.204105 | 0.184969 | 0.189688 | cc/g |
| Particle Size Distribution | Mean | 84.02 | 76.1 | — | 57.2 | um |
| | Median | 74.4 | 71.3 | — | 56 | um |
| | Mode | 82.3 | 72.7 | — | 63.1 | um |
| | D10 | 17.06 | 34.1 | — | 19.3 | um |
| | D90 | 157.7 | 125.2 | — | 91.9 | um |
| Collidine | | — | 126 | 141.1 | 141.5 | umol/g |
| nPA | | — | 0.8778 | 0.8303 | 0.9532 | mmol/g |
| TPAD | TPAA | — | 0.937502 | 0.886131 | 1.024357 | meq/g |
| | TPAD | — | 0.873905 | 0.831626 | 0.956759 | meq/g |
| | Max Temp | — | 265.493 | 265.5 | 265.522 | C. |
| | Peak Height | — | 0.004466 | 0.003833 | 0.004756 | meq/g/C. |

Using the catalysts described above, we made a $C_{14}$ AN blendstock and a $C_{16}$ AN blendstock in step-by-step batch process using an acid-form of MCM-22 and MCM-49, MCM-22H and MCM-49H, as described in Examples 2 to 5 immediately below.

Example 2

$C_{16}$ AN Blendstock Step-By-Step Batch Process

We prepared four experiments (Exp. A, Tables 7 A & 7B) that produced the $C_{16}$ AN blendstock in a step-by-step batch process by first weighing 605.3 grams of 1-hexadecene (LAO16) and placing it into addition flask connected to metering pump. 190.7 grams naphthalene, 12.4 grams MCM-22H catalyst, and 16.5 grams of Sasol 1012 normal paraffin co-solvent were added to a 2-liter Parr reactor. Reactor headspace was pressurized with nitrogen and a vacuum pulled. The step of nitrogen pressuring and pulling a vacuum was repeated multiple times. The reactor content was then heated to 90° C. and stirred by increasing the speed to 500 rpm. Prior to the addition of LAO16, the temperature of the reactor was raised to 200° C. LAO16 was then added to the reactor by opening the LAO16 feed valve and turning on the feed pump to a flow rate of 10.1 grams/min for 60 minutes. Once the addition of LAO16 is complete, the feed pump was turned off and the feed valve was closed. To complete the alkylation reaction, the temperature of the reactor was quickly raised to 210° C. and this temperature was held for 60 minutes. The temperature of the reactor was then cooled to room temperature using a water-cooling system and the pressure was vented off the reactor. Double filtration of the reactor effluent was performed with fresh filter beds (Celite 545 filter aid) at ambient temperature. The filtered reactor effluent was loaded into a vacuum distillation unit and unreacted naphthalene, LAO16, and Sasol 1012 solvent were removed overhead to reach <0.5 wt % of unreacted naphthalene and unreacted olefins. Accounting for losses due to sampling, the yield of the $C_{16}$ AN blendstock was >80 wt %.

Example 3

$C_{16}$ AN Blendstock Synthesis with Soda Ash Treatment

We prepared six experiments (Exp. B, Tables 7A & 7B) that produced the $C_{16}$ AN blendstock in a step-by-step batch process by first weighing 607.8 grams of 1-hexadecene (LAO16) and placed it into an addition flask connected to a metering pump. 191.5 grams of naphthalene, 8.2 grams of MCM-22H catalyst, and 16.5 grams of Sasol 1012 normal paraffin co-solvent were added to a 2-liter Parr reactor. Reactor headspace was pressurized with nitrogen and a vacuum pulled. The step of nitrogen pressuring and pulling a vacuum was repeated multiple times. The reactor content was then heated to 90° C. and stirred by increasing the speed to 500 rpm. Prior to the addition of LAO16, the temperature of the reactor was raised to 200° C. LAO16 was then added to the reactor by opening the LAO16 feed valve and turning on the feed pump to a flow rate of 10.1 grams/min for 60 minutes. Once the addition of LAO16 is complete, the feed pump was turned off and the feed valve was closed. To complete the alkylation reaction, the temperature of the reactor was quickly raised to 210° C. and this temperature was held for 60 minutes. The temperature of the reactor was then cooled to room temperature using a water-cooling system and the pressure was vented off the reactor. 1 gram of soda ash was added to the reactor to neutralize the catalyst and the reactor content was stirred for 60 minutes. Double filtration of the reactor effluent was performed with fresh filter beds (Celite 545 filter aid) at ambient temperature. The filtered reactor effluent was loaded into a vacuum distillation unit and unreacted naphthalene, LAO16, and Sasol 1012 solvent were removed overhead to reach <0.5 wt % of unreacted naphthalene and unreacted olefins. Accounting for losses due to sampling, the yield of $C_{16}$ AN blendstock was >80 wt %.

Example 4

$C_{14}$ AN Blendstock Step-By-Step Batch Process

We prepared four experiments (Exp. C, Tables 7A & 7B) that produced the $C_{14}$ AN blendstock in a step-by-step batch process by first weighing 581.0 grams of 1-tetradecene (LAO14) and placing it into addition flask connected to metering pump. 217.2 grams naphthalene, 8.2 grams MCM-22H catalyst, and 16.5 grams of Sasol 1012 normal paraffin co-solvent were added to a 2-liter Parr reactor. Reactor headspace was pressurized with nitrogen and a vacuum pulled. The step of nitrogen pressuring and pulling a vacuum was repeated multiple times. The reactor content was then heated to 90° C. and stirred by increasing the speed to 500 rpm. Prior to the addition of LAO14, the temperature of the reactor was raised to 200° C. LAO14 was then added to the reactor by opening the LAO14 feed valve and turning on the feed pump to a flow rate of 9.7 grams/min for 60 minutes. Once the addition of LAO14 was complete, the feed pump was turned off and the feed valve was closed. To complete the alkylation reaction, the temperature of the reactor was quickly raised to 210° C. and this temperature was held for 60 minutes. The temperature of the reactor was then cooled to room temperature using a water-cooling system and the pressure was vented off the reactor. Double filtration of the reactor effluent was performed with fresh filter beds (Celite 545 filter aid) at ambient temperature. The filtered reactor effluent was loaded into a vacuum distillation unit and unreacted naphthalene, LAO14, and Sasol 1012 solvent overhead were removed to reach <0.5 wt % of unreacted naphthalene and unreacted olefins. Accounting for losses due to sampling, the yield of the $C_{14}$ AN blendstock was >80 wt %.

Example 5

$C_{14}$ AN Blendstock Synthesis with Soda Ash Treatment

We prepared an experiment (Exp. D, Tables 7A & 7B) that produced $C_{14}$ AN blendstock in a step-by-step batch process by first weighing 581.0 grams of 1-tetradecene (LAO14) and placed it into an addition flask connected to a metering pump. 217.2 grams of naphthalene, 8.2 grams of MCM-22H catalyst, and 16.5 grams of Sasol 1012 normal paraffin co-solvent were added to a 2-liter Parr reactor. Reactor headspace was pressurized with nitrogen and a vacuum pulled. The step of nitrogen pressuring and pulling a vacuum was repeated multiple times. The reactor content was then heated to 90° C. and stirred by increasing the speed to 500 rpm. Prior to the addition of LAO14, the temperature of the reactor was raised to 200° C. LAO14 was then added to the reactor by opening the LAO14 feed valve and turning on the feed pump to a flow rate of 9.7 grams/min for 60 minutes. Once the addition of LAO14 is complete, the feed pump was turned off and the feed valve was closed. To complete the alkylation reaction, the temperature of the reactor was quickly raised to 210° C. and this temperature was held for 60 minutes. The temperature of the reactor was then cooled to room temperature using a water-cooling system and the pressure was vented off the reactor. 1 gram of soda ash was added to the reactor to neutralize the catalyst and the reactor content was stirred for 60 minutes. Double filtration of the reactor effluent was performed with fresh filter beds (Celite 545 filter aid) at ambient temperature. The filtered reactor effluent was loaded into a vacuum distillation unit and unreacted naphthalene, LAO14, and Sasol 1012 solvent were removed overhead to reach <0.5 wt % of unreacted naphthalene and unreacted olefins. Accounting for losses due to sampling, the yield of the $C_{14}$ AN blendstock was >80 wt %.

Example 6

Lubricant Formulation With the AN Blendstock

The alkylated naphthalene blendstocks of Exp. A, Exp. B., Exp. C & Exp. D were then tested as a blendstock for the lubricant formulation that will reduce costs while still maintaining the performance benefits provided by the combination of AN5 blendstock and AN12 blendstock. A single step synthesis (as compared with two different synthetic steps in two different locations) was used having benefits in reduced transportation of raw materials, improved economy of scale and per-fluorinated alkyl substance removal from the synthesis. The AN blendstock provides solvency and oxidative benefits of AN5 blendstock and optimal elastomer compatibility of AN12 blendstock.

Table 10A, Table 10B, Table 11A, and Table 11B immediately below provide lubricant formulations that can be used.

TABLE 10A

| Lubricant Formulation | | A | B | C |
|---|---|---|---|---|
| Cobase A | AN5 | 20 | 8 | 8 |
| Cobase B | AN12 | 0 | 15 | 15 |
| PAO | PAO4/mPAO150 | Balance | Balance | Balance |
| PIB | Various | — | — | — |
| Additive | Various | 1.8 | 1.8 | 1.8 |

TABLE 10B

| Lubricant Formulation | | D | E | F |
|---|---|---|---|---|
| Cobase A | AN5 | 8 | 8 | 8 |
| Cobase B | AN12 | 15 | 15 | 15 |
| PAO | PAO4/mPAO150 | Balance | Balance | Balance |
| PIB | Various | — | — | — |
| Additive | Various | 1.8 | 1.8 | 1.8 |

TABLE 11A

| Lubricant Formulation | | A | B | C |
|---|---|---|---|---|
| Cobase A | AN5 | 20 | 0 | 0 |
| Cobase B | AN* | 0 | 23 | 23 |
| PAO | PAO4/mPAO150 | Balance | Balance | Balance |
| PIB | Various | — | — | — |
| Additive | Various | 1.8 | 1.8 | 1.8 |

TABLE 11B

| Lubricant Formulation | | D | E | F |
|---|---|---|---|---|
| Cobase A | AN5 | 0 | 0 | 0 |
| Cobase B | AN* | 23 | 23 | 23 |
| PAO | PAO4/mPAO150 | Balance | Balance | Balance |
| PIB | Various | — | — | — |
| Additive | Various | 1.8 | 1.8 | 1.8 |

As shown in Table 12, performance tests show equivalence between the AN blendstock of Lubricant Formulation D of Tables 11A & 11B (both $C_{14}$ and $C_{16}$ based) when used in a fully formulated lubricant. Data was compared against the reference lubricant formulation and showed equivalent performance with the present AN blendstock. The AN blendstock provided herein can be used in product applications such as lubricant formulation for passenger vehicles, commercial vehicles, industrial, grease of various blendstocks and additives using treat rates that range from 1 wt % to 60 wt %.

TABLE 12

Properties of Lubricant Formulation C with the AN Blendstock

| | Description | $C_{14}$ Based | Reference | $C_{16}$ Based |
|---|---|---|---|---|
| Inspections | AMS1738/LUB APPEARANCE | Clear & Bright | Clear & Bright | Clear & Bright |
| | D445-3/ASV Kinematic Viscosity, 40° C., MM2/S | 205.9 | 211.3 | 210 |
| | D445-5/ASV Kinematic Viscosity, 100° C., MM2/S | 28.21 | 28.81 | 28.51 |
| | WI320/ASV FTIR of Finished Fluids | | Match | |
| | D5185/ASV Phosphorus (P), PPM | 527 | 498 | 513 |
| | D5185/ASV Silicon (Si), PPM | 17 | 14 | 19 |
| | D2622-1/CLN Sulfur (S), MG/KG | 30.6 | 13.8 | 27.2 |
| Interfacial Properties | D3427-5/ASV Time to 0.2% Air, MIN | 11.5 | 13 | 12.3 |
| | AMS1393MOD-9/LUB Volume Increase at 20 sec, % | 7.7 | 2.5 | 5 |
| | AMS1393MOD-9/LUB Volume Increase at 5 min, % | 2.6 | 2.5 | 0 |
| | AMS1393MOD-9/LUB Volume Increase at 30 min, % | 0 | 0 | 0 |
| | D892/ASV SEQ 1, ml/min | 0/0 | 0/0 | 0/0 |
| | D892/ASV SEQ 2, ml/min | 20/0 | 10/0 | 0/0 |
| | D892/ASV SEQ 3, ml/min | 0/0 | 0/0 | 0/0 |
| | D1401-1/ASV 37 ML WATER TIME, MIN | 10 | 15 | 15 |
| | D2711-1/ASV Tot Free Water, ml | 81.8 | 81.4 | 81.8 |
| | D2711-1/ASV Emul Aft Cnfge, ml | 0 | 0 | 0 |
| | D2711-1/ASV AVG Water in Oil, % | 0.9 | 0.8 | 0.7 |
| Low Temperature Properties | D2983-15/ASV Brookfield Viscosity, −30 C., MPA · S | 34500 | 35200 | 36400 |
| | D2983-7/ASV Brookfield Viscosity, −40 F., MPA · S | 134000 | 133800 | 134600 |
| | D5950/ASV Pour Point of Petroleum Oils, C. | −48 | −48 | −46 |
| Filterability | WI027-3/LUB Dry Filterability Ratio | 97.1/94.3 | 97.1/95.3 | 96.7/94.2 |
| | WI027-4/LUB Wet Filterability Ratio | 92.9/87.8 | 92.7/86.5 | 95.0/89.2 |
| Volatility | D5800/ASV EVAPORATION LOSS-PROCEDURE B, % | 7.58 | 6.34 | 6.15 |
| Oxidation | D2893-9/ASV US Steel 150C KV100, % | 12.9% | 10.0% | 10.6% |
| | D2893-2/ASV US Steel 121C KV100, % | 6.6%, 5.8% | 5.5%, 5.4% | 6.1% |
| | D2272-10/ASV RPVOT 150C, min | 1964, 970 | 1837 | 1381 |
| Tribological Characteristics | WI091/LUB EHL Film Thickness | | Match | |
| | MTM | | Match | |

TABLE 12-continued

| Properties of Lubricant Formulation C with the AN Blendstock | | | | |
|---|---|---|---|---|
| | Description | $C_{14}$ Based | Reference | $C_{16}$ Based |
| Elastomer Compatibility | NBR 902, 1008 hr, 95 C.: Hardness | 1 | 2 | 2 |
| | NBR 902, 1008 hr, 95 C.: Volume | 6.6 | 5.8 | 5.9 |
| | NBR 902, 1008 hr, 95 C.: Tensile | 0 | 4.4 | −1.5 |
| | NBR 902, 1008 hr, 95 C.: Elongation | −18.5 | −18.1 | −22.3 |

ADDITIONAL EMBODIMENTS

Additionally, or alternately, the invention relates to:

Embodiment 1. A process for making an AN blendstock comprising the steps of:

mixing an acid-form MWW-type catalyst, naphthalene, and a solvent to provide a reaction mixture, wherein the acid-form MWW-type catalyst has an average particle distribution between 55 and 85 μm, a surface area between 475 and 600 $m^2/g$, and a total acidity of between 0.80 and 1.0 meq/g TPAD;

increasing the temperature of the reaction mixture; and adding linear alpha olefins to the reaction mixture to produce the AN blendstock comprising an isomer ratio of less than 45 wt % mono alkylated naphthalene and greater than 55 wt % multi-alkylated naphthalene.

Embodiment 2. The process for making an AN blendstock of embodiment 1, wherein the AN blendstock has a kinematic viscosity between about 7.0 and 9.5 cSt KV100 as measured by D445.

Embodiment 3. The process for making an AN blendstock of embodiment 1, wherein the acid-form MWW-type catalyst is MCM-22H.

Embodiment 4. The process for making an AN blendstock of embodiment 1, wherein the catalyst load is less than 1.5 wt %.

Embodiment 5. The process for making an AN blendstock of embodiment 1, wherein the linear alpha olefins comprise LAO14.

Embodiment 6. The process for making an AN blendstock of embodiment 1, wherein the linear alpha olefins comprise LAO16.

Embodiment 7. The process for making an AN blendstock of embodiment 1, wherein the multi-alkylated naphthalene comprises di-alkylated naphthalene and tri-alkylated naphthalene.

Embodiment 8. The process for making an AN blendstock of embodiment 1, wherein the AN blendstock comprises more than 30 wt % di-alkylated naphthalene.

Embodiment 9. The process for making an AN blendstock of embodiment 1, wherein at least 98 wt % of naphthalene is converted.

Embodiment 10. The process for making an AN blendstock of embodiment 1, where the AN blendstock is made without triflic catalyst.

Embodiment 11. A lubricant formulation comprising the AN blendstock produced by the process of any one of the preceding embodiments.

Embodiment 12. A process of making a lubricant formulation comprising the step of blending a PAO base stock with an AN blendstock in a single step, wherein the lubricant formulation has a kinematic viscosity between 25 and 30 KV100 measured by D445-3 and comprises an isomer ratio of less than 45 wt % mono alkylated naphthalene and greater than 55 wt % multi-alkylated naphthalene.

Embodiment 13. The process of making a lubricant formulation of embodiment 12 wherein the process does not include a step of combining two or more blendstocks.

Embodiment 14. The process of making a lubricant formulation of embodiment 12 wherein the AN blendstock is made without a triflic catalyst.

Embodiment 15. An AN blendstock comprising monoalkylated naphthalene and multi-alkylated naphthalene AN blendstock having between 7.0 and 9.5 cSt KV100 measured by ASTM D445 and between 5.0 and 11.0 Noack % measured by ASTM D5800, wherein the AN blendstock has an isomer ratio of less than 40 wt % mono alkylated naphthalene and greater than 55 wt % multi-alkylated naphthalene.

Embodiment 16. An AN blendstock formed by mixing an acid-form MWW-type catalyst, naphthalene, and a solvent to provide a reaction mixture, wherein the acid-form MWW-type catalyst has an average particle distribution between 55 μm and 85 μm, a surface area between 475 and 600 $m^2/g$, and a total acidity of between 0.80 and 1.0 meq/g TPAD; increasing the temperature of the reaction mixture; and adding linear alpha olefins to the reaction mixture and comprising an isomer ratio of less than 45 wt % mono alkylated naphthalene and greater than 55 wt % multi-alkylated naphthalene and a kinematic viscosity between 7.0 and 9.5 cSt KV100 measured by ASTM D445.

Embodiment 17. An acid-form MWW-type catalyst composition comprising:

between 5.0 wt % and 7.5 wt % alumina;

between 69 wt % and 80 wt % silica;

between about 17.0 wt % and 24.0 wt % $Si/Al_2$;

less than 0.03 wt % potassium; and less than or equal to 0.05 wt % sodium as measured by ICP Test, wherein the acid-form MWW type of catalyst having an average particle size distribution between 55 μm and 85 μm, a total surface area between 475 and 600 $m^2/g$, a total acidity between 0.80 and 1.0 meq/g TPAD and collidine uptake between 125 and 145 μmol/g.

Embodiment 18. The process for making an AN blendstock of embodiment 1, wherein the linear alpha olefins are a mPAO.

Embodiment 19. The process for making an AN blendstock of embodiment 1, wherein the linear alpha olefins are a hybrid PAO.

Embodiment 20. The process for making an AN blendstock of embodiment 1, wherein the linear alpha olefins comprise at least two different linear alpha-olefins selected from $C_3$ to $C_{30}$ LAO.

Many alterations, modifications, and variations will be apparent to those skilled in the art in light of the foregoing description without departing from the spirit or scope of the present disclosure and that when numerical lower limits and numerical upper limits are listed herein, ranges from any lower limit to any upper limit are contemplated.

The invention claimed is:

1. A process for making an alkylated naphthalene (AN) blendstock comprising the steps of:

mixing an acid-form MWW-type catalyst, naphthalene, and a solvent to provide a reaction mixture, wherein the acid-form MWW-type catalyst has an average particle distribution between 55 μm and 85 μm, a surface area between 475 and 600 $m^2/g$, and a total acidity of between 0.80 and 1.0 meq/g TPAD;

increasing the temperature of the reaction mixture; and adding linear alpha olefins to the reaction mixture to produce the AN blendstock comprising an isomer ratio of less than 45 wt % mono alkylated naphthalene and greater than 55 wt % multi-alkylated naphthalene, wherein the linear alpha olefins comprise LAO14 or LAO16.

2. The process for making an AN blendstock of claim 1, wherein the AN blendstock has a kinematic viscosity between about 7.0 and 9.5 cSt KV100 as measured by D445.

3. The process for making an AN blendstock of claim 1, wherein the acid-form MWW-type catalyst is MCM-22H.

4. The process for making an AN blendstock of claim 1, wherein the catalyst load is less than 1.5 wt %.

5. The process for making an AN blendstock of claim 1, wherein the multi-alkylated naphthalene comprises di-alkylated naphthalene and tri-alkylated naphthalene.

6. The process for making an AN blendstock of claim 1, wherein the AN blendstock comprises more than 30 wt % di-alkylated naphthalene.

7. The process for making an AN blendstock of claim 1, wherein at least 98 wt % of naphthalene is converted.

8. The process for making an AN blendstock of claim 1, where the AN blendstock is made without triflic catalyst.

9. The process for making an AN blendstock of claim 1, wherein the linear alpha olefins are a mPAO.

10. The process for making an AN blendstock of claim 1, wherein the linear alpha olefins are a hybrid PAO.

11. The process for making an AN blendstock of claim 1, wherein the linear alpha olefins comprise at least two different linear alpha-olefins selected from $C_3$ to $C_{30}$ LAO.

* * * * *